UNITED STATES PATENT OFFICE 2,429,596

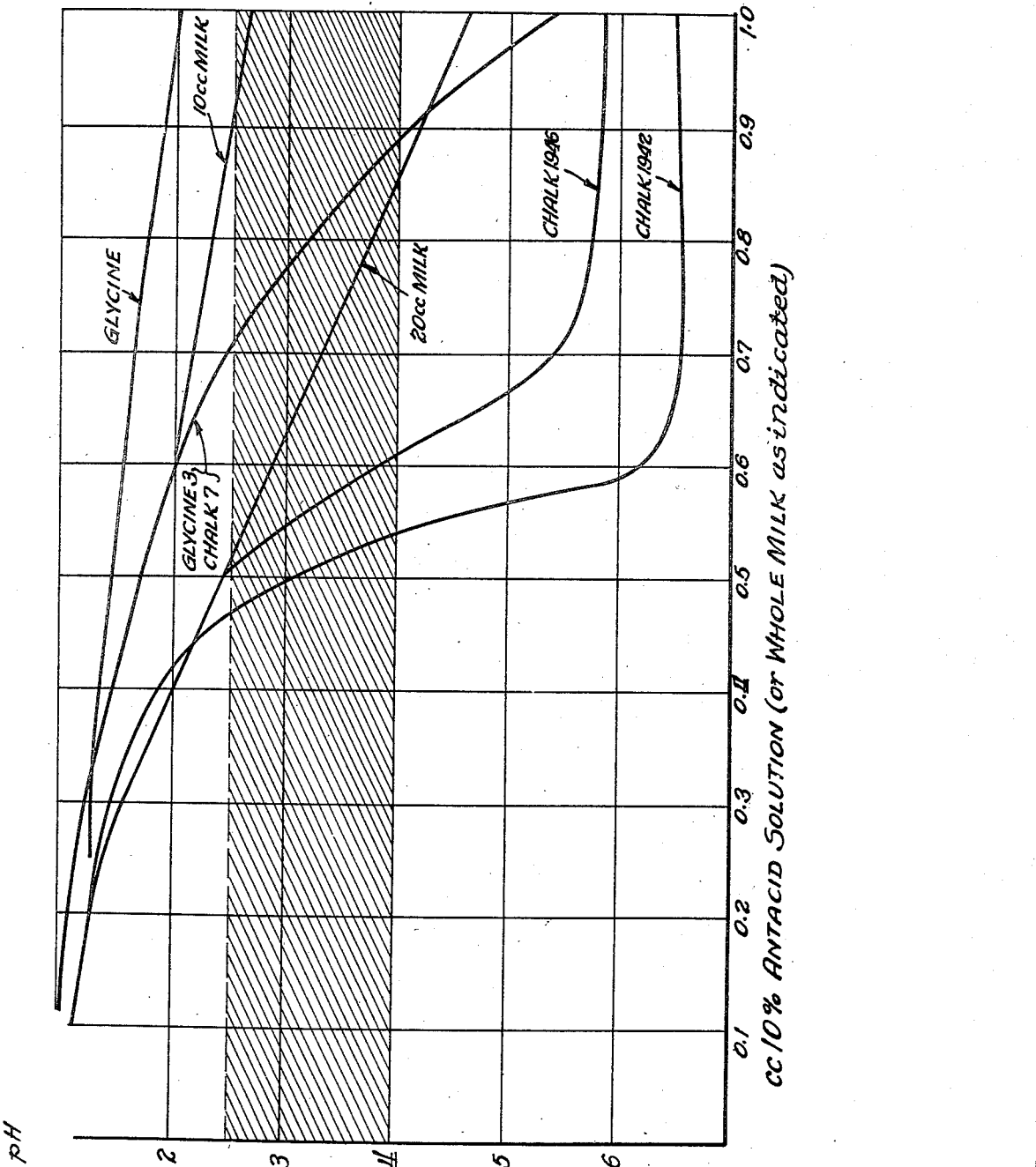

GLYCINE-CALCIUM CARBONATE ANTACID

Harold A. Abramson, New York, N. Y.

Application February 10, 1944, Serial No. 521,812

1 Claim. (Cl. 167—55)

My invention relates, generally, to improved gastric antacid compositions, and particularly to gastric antacid compositions having buffer curves similar to that of milk.

The object of my invention, briefly stated, is to provide a new and improved non-toxic antacid composition having food value, and pH properties similar to those of milk, and which may be used with beneficial results for relieving mild gastric disturbances.

It has been found that a mixture of glycine (also known as glycocoll and amino-acetic acid), and calcium carbonate in the form of precipitated chalk, when in aqueous dispersion give buffer curves upon titration which are very similar to the buffer curve of milk.

Although the proportions of the two essential ingredients may vary within narrow limits while providing compositions having buffer curves corresponding closely to the buffer curve of milk, a mixture of 7 parts by weight of precipitated chalk (U. S. P.) and 3 parts by weight of glycine has been found to be presently preferred. This particular mixture has been used with highly satisfactory results in the treatment of over twenty patients suffering with mild gastric complaints. Fifteen of these patients were atopic (constitutionally allergic).

The mixture is readily dispersible in water in which the glycine is soluble, is non-toxic even in excessive doses, and the glycine may be utilized by the body as a food.

The usual dose is from one to two teaspoonfuls of the fluffy sweet powder. The sweet taste of the glycine makes the antacid compositions attractive to adults as well as to children. Although not required, the usual flavoring and coloring agents may be added if desired.

The accompanying drawing contains a number of curves which serve to show that the antacid properties of my antacid composition correspond to those of milk, whereas, the individual ingredients of the composition have considerably different antacid properties. The curves were obtained by titrating 0.1 N HCl with the different antacids while measuring pH with a Beckmann pH meter.

The legends on the drawing serve to make it self-explanatory, for the most part. The area covering the pH range of 2.5–4 has been shaded, since this is the pH range wherein antacids must function. There is of course some divergence among authorities as to the exact limits of the range. However, it is pretty well established that hyperacidity occurs when the pH of the gastric juices is much below 2.5, while a pH of much more than 4.0 is objectionable as it curtails the digestive processes.

The glycine curve shows that this compound by itself is not a sufficiently strong antacid to effectively neutralize the gastric juices to the desired pH range of 2.5–4. Two curves are given for precipitated chalk, since different samples of this material give slightly different curves. The two curves for chalk show the well known fact that this material by itself is not a satisfactory antacid since it gives a too rapid pH shift from around pH 2 to around pH 6. It will be noted that the curve for my antacid composition containing 3 parts of glycine to 7 parts of chalk in the important range of pH 2.5–4 is intermediate between glycine alone and chalk alone. Within this antacid range of pH 2.5–4, the antacid composition lies in what may be termed the milk range. Stated otherwise, the curves show that a small dose of my antacid composition corresponds within wide limits to the antacid properties of milk itself.

Having fully described my invention and the presently preferred embodiment thereof, it will be seen that antacid compositions provided by this invention have the following combination of properties and are believed to be new in the art:

(1) Having buffer curves similar to that of milk.
(2) Having food value.
(3) Being non-toxic even in excessive doses.
(4) Having a pleasant taste without the addition of flavoring agents.
(5) Being readily dispersible in water in which the glycine dissolves and the precipitated chalk remains suspended.

I claim:

An antacid composition consisting essentially of about 3 parts by weight of glycine and about 7 parts by weight of precipitated chalk.

HAROLD A. ABRAMSON.

REFERENCES CITED

The following references are of record in the file of this patent:

UNITED STATES PATENTS

| Number | Name | Date |
|---|---|---|
| 1,654,090 | Shiraishi | Dec. 27, 1927 |
| 2,198,165 | Hamburger | Apr. 23, 1940 |
| 2,079,512 | Korosy | May 4, 1937 |
| 1,983,954 | Taylor | Dec. 11, 1934 |
| 2,101,867 | Miller | Dec. 14, 1937 |
| 2,362,386 | Lipschitz | Nov. 7, 1944 |

FOREIGN PATENTS

| Number | Country | Date |
|---|---|---|
| 475,291 | Great Britain | Nov. 17, 1937 |
| 522,646 | Great Britain | June 24, 1940 |

OTHER REFERENCES

Levy et al., American Journal of Digestive Diseases, Oct. 1942, pages 354 to 356. (Copy Nat. Inst. Health.)

Sizer, Medical Record (1941), vol. 153, pages 115 and 116.

Winton, Structure and Composition of Foods, vol. 3 (1937), page 81.